United States Patent [19]
Mihara et al.

[11] Patent Number: 5,940,283
[45] Date of Patent: Aug. 17, 1999

[54] HIGH VOLTAGE GENERATING DEVICE HAVING VARIABLE BOOSTING CAPABILITY ACCORDING TO MAGNITUDE OF LOAD

[75] Inventors: Masaaki Mihara; Yoshikazu Miyawaki, both of Hyogo, Japan

[73] Assignee: Mitsubishi Denki Kabushiki Kaisha, Tokyo, Japan

[21] Appl. No.: 08/882,344

[22] Filed: Jun. 25, 1997

[30] Foreign Application Priority Data

Jan. 21, 1997 [JP] Japan .................................. 9-008542

[51] Int. Cl.⁶ ........................................................ H02M 3/07
[52] U.S. Cl. ........................................... 363/60; 307/110
[58] Field of Search ........................ 363/59, 60; 323/284, 323/285; 307/110

[56] References Cited

U.S. PATENT DOCUMENTS

| | | | |
|---|---|---|---|
| 4,661,717 | 4/1987 | Nishioka | 307/10 |
| 5,337,013 | 8/1994 | Langer et al. | 307/34 |
| 5,526,253 | 6/1996 | Duley | 363/59 |
| 5,553,295 | 9/1996 | Pantelakis et al. | 363/60 |
| 5,563,779 | 10/1996 | Cave et al. | 363/59 |
| 5,684,682 | 11/1997 | Zhong et al. | 363/59 |
| 5,760,637 | 6/1998 | Wong et al. | 363/60 |

FOREIGN PATENT DOCUMENTS

| | | |
|---|---|---|
| 5-217372 | 8/1993 | Japan . |
| 5-325580 | 12/1993 | Japan . |
| 7-58616 | 3/1995 | Japan . |
| 7-201174 | 8/1995 | Japan . |

*Primary Examiner*—Peter S. Wong
*Assistant Examiner*—Derek J. Jardieu
*Attorney, Agent, or Firm*—McDermott, Will & Emery

[57] ABSTRACT

A high voltage generating device includes a charge pump generating high voltage by boosting a power supply voltage and supplying it to a load, a timer measuring activation time of the charge pump and outputting a signal after a prescribed time period, an A-D converter converting an output voltage of the charge pump into a digital value in response to the signal and outputting four bit binary data, and a current limiting circuit including four P channel MOS transistors connected in parallel between a power supply node and a drain of an N channel MOS transistor which has a gate receiving the digital value output from the A-D converter.

17 Claims, 11 Drawing Sheets

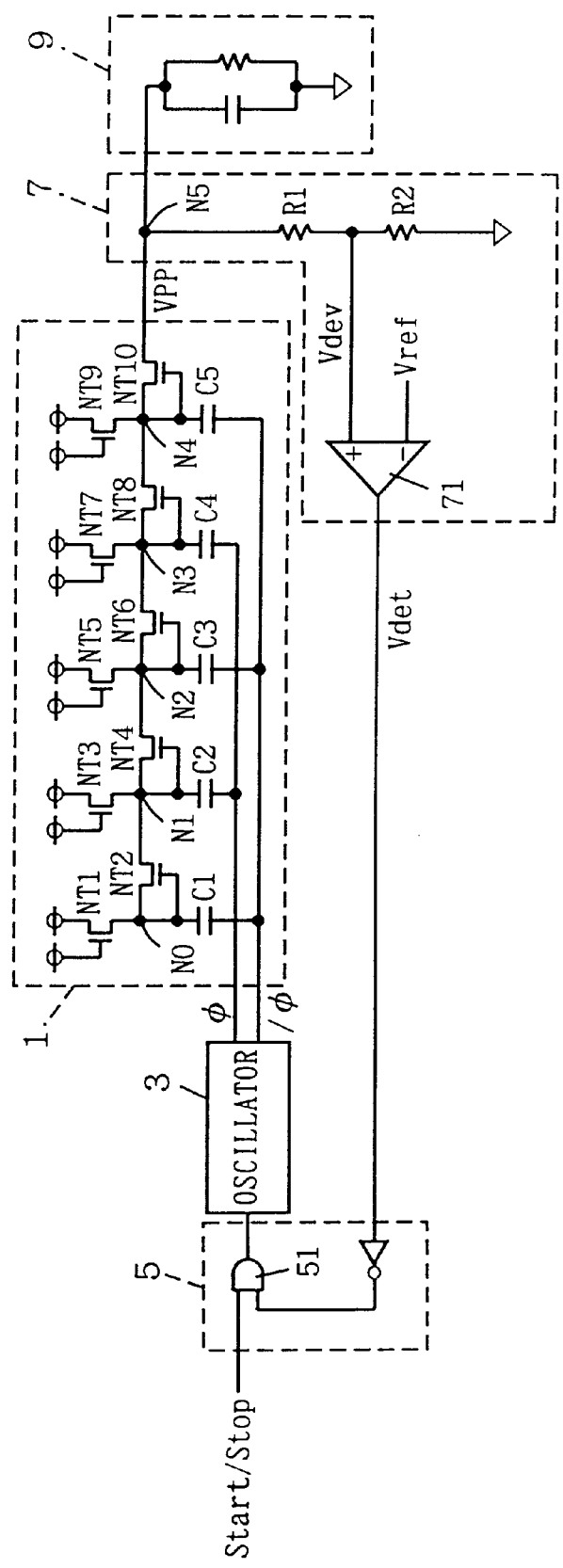
F I G. 1 1 PRIOR ART

HIGH VOLTAGE GENERATING DEVICE HAVING VARIABLE BOOSTING CAPABILITY ACCORDING TO MAGNITUDE OF LOAD

BACKGROUND OF THE INVENTION

1. Field of the Invention

The present invention relates to a semiconductor memory device and more particularly to a high voltage generating device which generates high voltage by utilizing the charge pump technology.

2. Description of the Background Art

FIG. 11 shows a structure of a conventional high voltage generating device. As shown in FIG. 11, this high voltage generating device is connected to a load 9, and it includes a charge pump 1, an oscillator 3, a charge pump control circuit 5, and a detecting circuit 7.

Charge pump 1 generates a high voltage VPP in response to clock pulses φ, /φ generated from oscillator 3. Specifically, when clock pulse /φ is at a high (H) level, for example, current flows from node N0 to N1, from node N2 to N3, and from node N4 to N5. A node N (2 m) has a higher potential than a node N(2 m+1) by approximately a threshold voltage.

When clock pulse /φ falls to a low (L) level, potentials of nodes N0 to N5 tend to decrease due to capacitance coupling. However, current supplied from the left side raises the potentials higher than they were when clock pulse /φ was previously at the L level. At this time, clock pulse φ attains the H level, and current is supplied from node N1 to N2 and from node N3 to N4.

When clock pulse φ returns to the L level, current is supplied again from node N0 to N1, from node N2 to N3, and from node N4 to N5, and nodes N1, N3, N5 have higher potentials than they did in the previous cycle. Assuming that current is supplied from left to right, and coupling ratio of capacitors C1, C2 and so on is α, clock amplitude is Vosc, and a threshold voltage is $V_{TN}$, then potential is raised by about $(\alpha Vosc - V_{TN})$ per stage.

Detecting circuit 7 detects an output voltage VPP of charge pump 1.

Specifically, output voltage VPP is divided by resistors R1 and R2, and a potential at a node between R1 and R2 is Vdev. Based on comparison between potential Vdev and a reference voltage Vref by comparator 71, detecting circuit 7 outputs an H level detecting signal Vdet if potential Vdev >reference voltage Vref, and an L level detecting signal Vdet if potential Vdev <reference voltage Vref.

Here, a desirable value of output voltage VPP from charge pump 1 is (R1+R2)·Vref/R2.

Then, charge pump control circuit 5 stops oscillator 3 in response to the H level detecting signal from detecting circuit 7, and operates oscillator 3 in response to the L level detecting signal from detecting circuit 7.

A flash memory, for example, has a mode applying high voltage generated by a charge pump directly to memory cells. The number of memory cells receiving the high voltage varies in accordance with write or erase patterns. Therefore, magnitude of a load for a charge pump differs from one pattern to another. The performance of the charge pump should be determined so that it is sufficient for that one of the operation modes which has the maximum load.

Therefore, the load may become very light depending on the operation mode as described above. This results in overpower, making undesirable ripple phenomenon more conspicuous.

SUMMARY OF THE INVENTION

An object of the present invention is to provide a high voltage generating device which can vary its boosting capability according to magnitude of a load.

According to one aspect of the present invention, the high voltage generating device includes a high voltage generating circuit generating high voltage by boosting a power supply voltage, and supplying it to a load, a load estimating circuit estimating magnitude of the load, and a boosting capability control circuit controlling boosting capability of the high voltage generating circuit according to the magnitude of the load estimated by the load estimating circuit.

According to another aspect of the present invention, the high voltage generating device includes a high voltage generating circuit generating high voltage by boosting a power supply voltage, and supplying it to a load, an output voltage detecting circuit detecting magnitude of the output voltage of the high voltage generating circuit, and a boosting capability control circuit controlling boosting capability of the high voltage generating circuit according to the magnitude of the output voltage detected by the output voltage detecting circuit.

Therefore, a main advantage of the present invention is that the boosting capability of the high voltage generating circuit is controlled according to the magnitude of the load, thus a ripple can be suppressed.

Another advantage of the present invention is that the boosting capability of the high voltage generating circuit is controlled according to the magnitude of its output voltage, thus a ripple can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows a structure of a conventional high voltage generating device.

DESCRIPTION OF THE PREFERRED EMBODIMENTS

Figure 1:
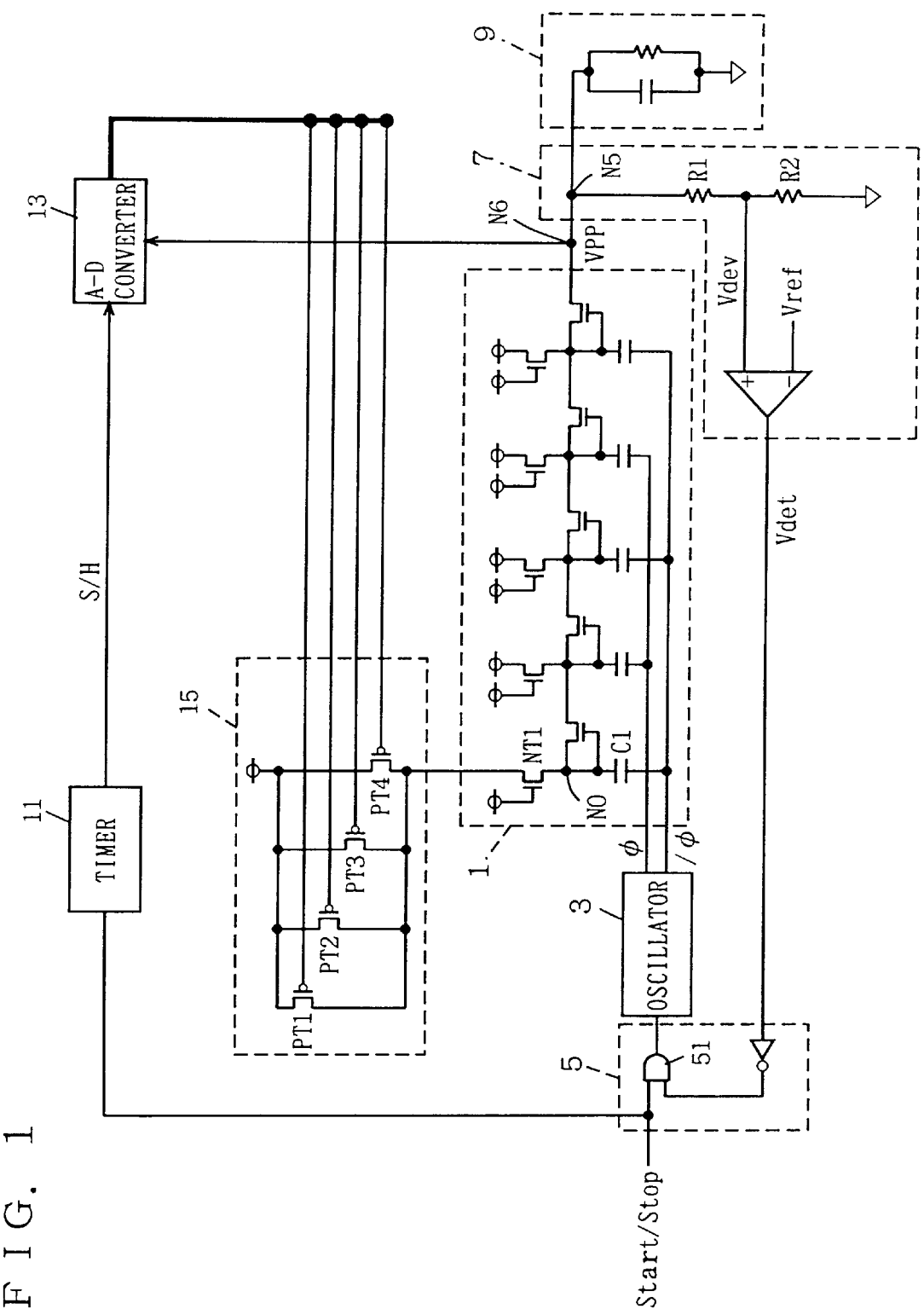
FIG. 1 shows an overall structure of a high voltage generating device in accordance with a first embodiment of the present invention.

Next, the embodiments of the present invention will be described in detail with reference to the drawings. The same or corresponding parts throughout the figures are designated by the same reference characters.

First Embodiment

FIG. 1 shows a structure of a high voltage generating device in accordance with the first embodiment of the present invention. As shown in FIG. 1, this high voltage generating device is connected to a load 9, and it includes a charge pump 1, an oscillator 3, a charge pump control circuit 5, a detecting circuit 7, a timer 11, an A-D converter 13, and a current limiting circuit 15.

Here, charge pump 1, oscillator 3, charge pump control circuit 5, and detecting circuit 7 have the same structures as in the conventional high voltage generating device above.

Timer 11 operates synchronously with a charge pump activating signal Start/Stop input to charge pump control circuit 5, and measures a prescribed time period set in advance, after the charge pump starts its operation.

Figure 2:
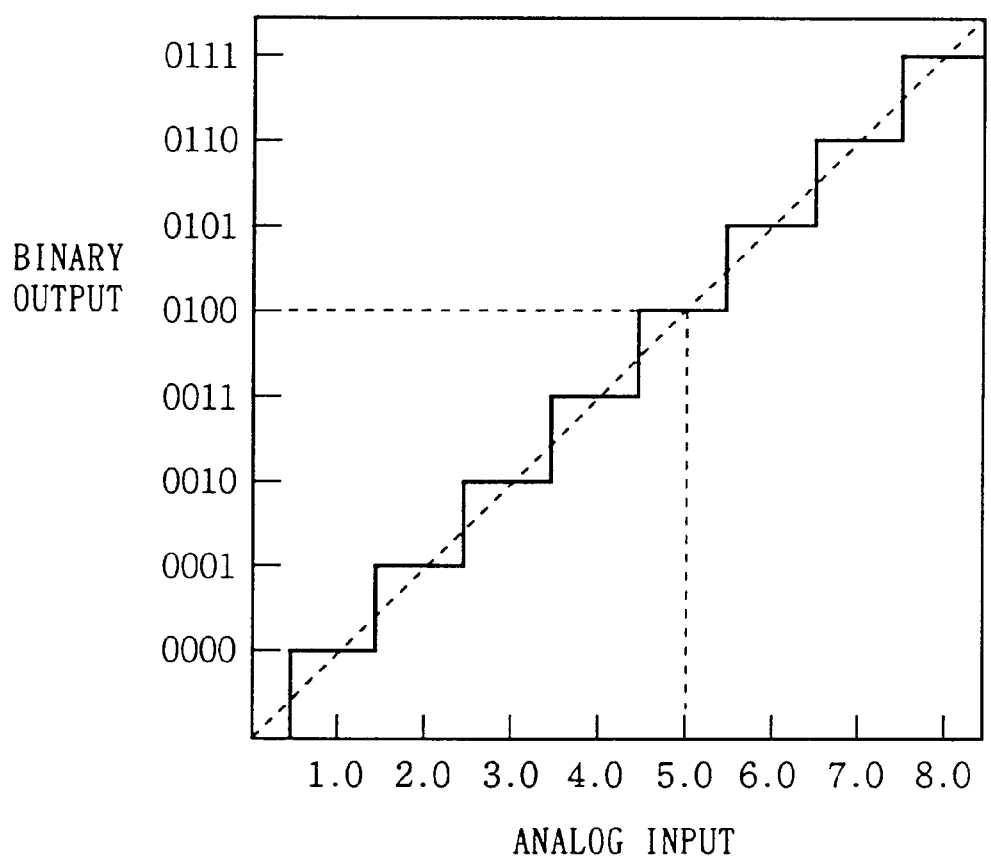
FIG. 2 shows characteristics of an A-D converter shown in FIG. 1.

A-D converter 13 receives an output voltage from an output node N6 of charge pump 1 in response to a sample/hold signal S/H output from timer 11, and converts its magnitude to a digital signal. FIG. 2 shows characteristics of this A-D converter 13. As shown in FIG. 2, if 5.0 V, for example, is received as an analog input, A-D converter 13 outputs a 4 bit digital value (0100).

Current limiting circuit 15 includes P channel MOS transistors PT1 to PT4 connected in parallel between a power supply node and a drain of a first stage N channel MOS transistor NT1 of charge pump 1. Each gate of P channel MOS transistors PT1 to PT4 is supplied with current corresponding to each bit of a 4 bit output signal (digital value) Vcc/GND from A-D converter 13.

Next, operation of the high voltage generating device in accordance with the first embodiment of the present invention will be described with reference to FIG. 3.

When charge pump activating signal Start/Stop of a high level is input to charge pump control circuit 5, charge pump 1 starts its pumping operation. At the same time, timer 11 starts measuring time.

Figure 3:
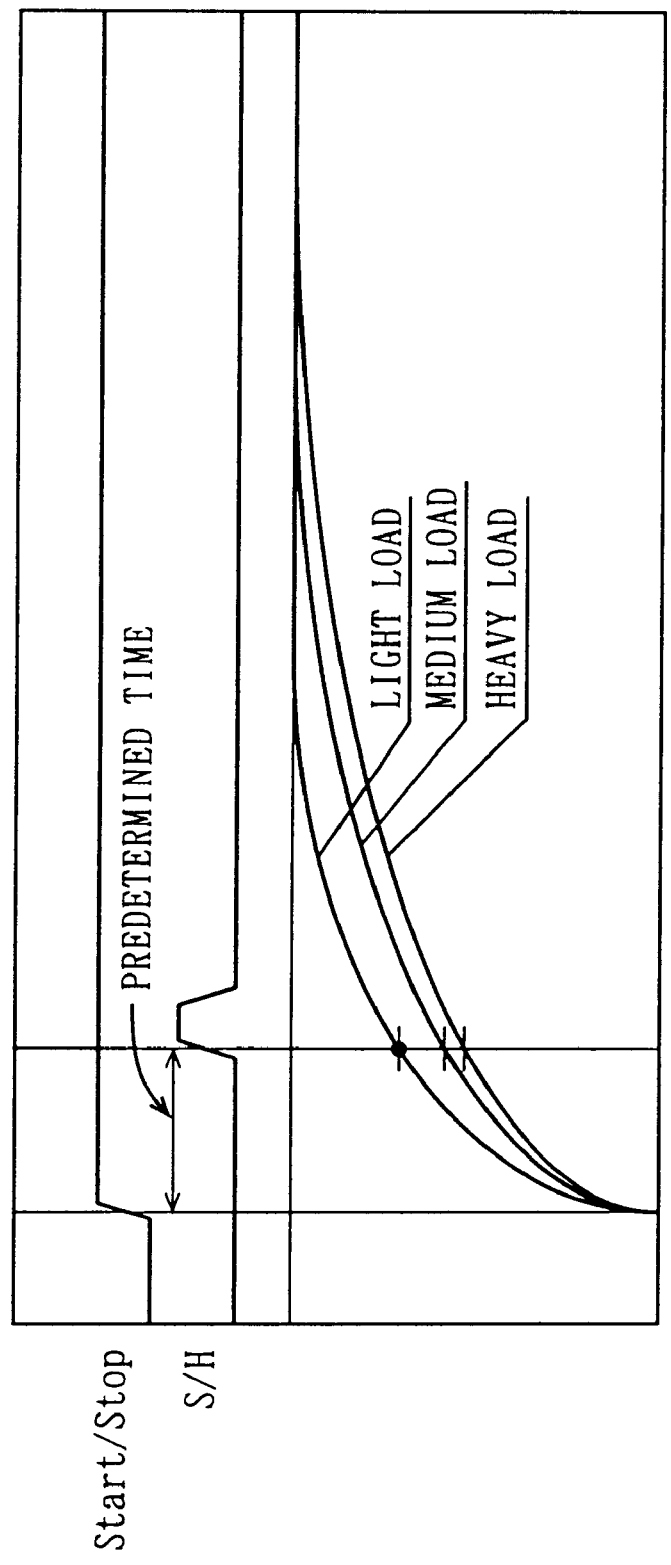
FIG. 3 illustrates operation of the A-D converter shown in FIG. 1.

Timer 11 outputs sample/hold signal S/H to A-D converter 13 after a predetermined period as shown in FIG. 3. A-D converter 13 samples an output voltage VPP from output node N6 of charge pump 1 in response to this sample/hold signal S/H, and determines binary data according to its potential. After that, the output data of A-D converter 13 is hold.

Since output voltage VPP from charge pump 1 rises moderately when externally connected load 9 is heavy, the level of the output voltage attained after a predetermined time period since the start of charge pump 1 operation is low, as shown in FIG. 3. Therefore, a small digital value is output.

On the other hand, since output voltage VPP from charge pump 1 rises steep when externally connected load 9 is light, the level of the output voltage attained after a predetermined time period since the start of charge pump 1 operation is high. In this case, a large digital value is output.

Thus, a digital value (0000) is output from A-D converter 13 when charge pump 1 starts its operation. Therefore, all P channel MOS transistors PT1 to PT4 included in current limiting circuit 15 are turned on, and maximum current is supplied to charge pump 1 from the power supply node. However, if externally connected load 9 is estimated to be light at A-D converter 13 afterward, a larger output digital value turns on a smaller number of P channel MOS transistors PT1 to PT4, so that current of smaller magnitude is supplied to charge pump 1. As a result, boosting capability of charge pump 1 is decreased.

On the other hand, if load 9 is estimated to be heavy, a smaller output digital value turns on a larger number of P channel MOS transistors PT1 to PT4, so that the magnitude of current supplied to charge pump becomes large. Therefore, the boosting capability of charge pump 1 is increased.

As described above, the boosting capability of charge pump 1 is adjusted according to the magnitude of externally connected load 9, thus a ripple is suppressed.

Second Embodiment

Figure 4:
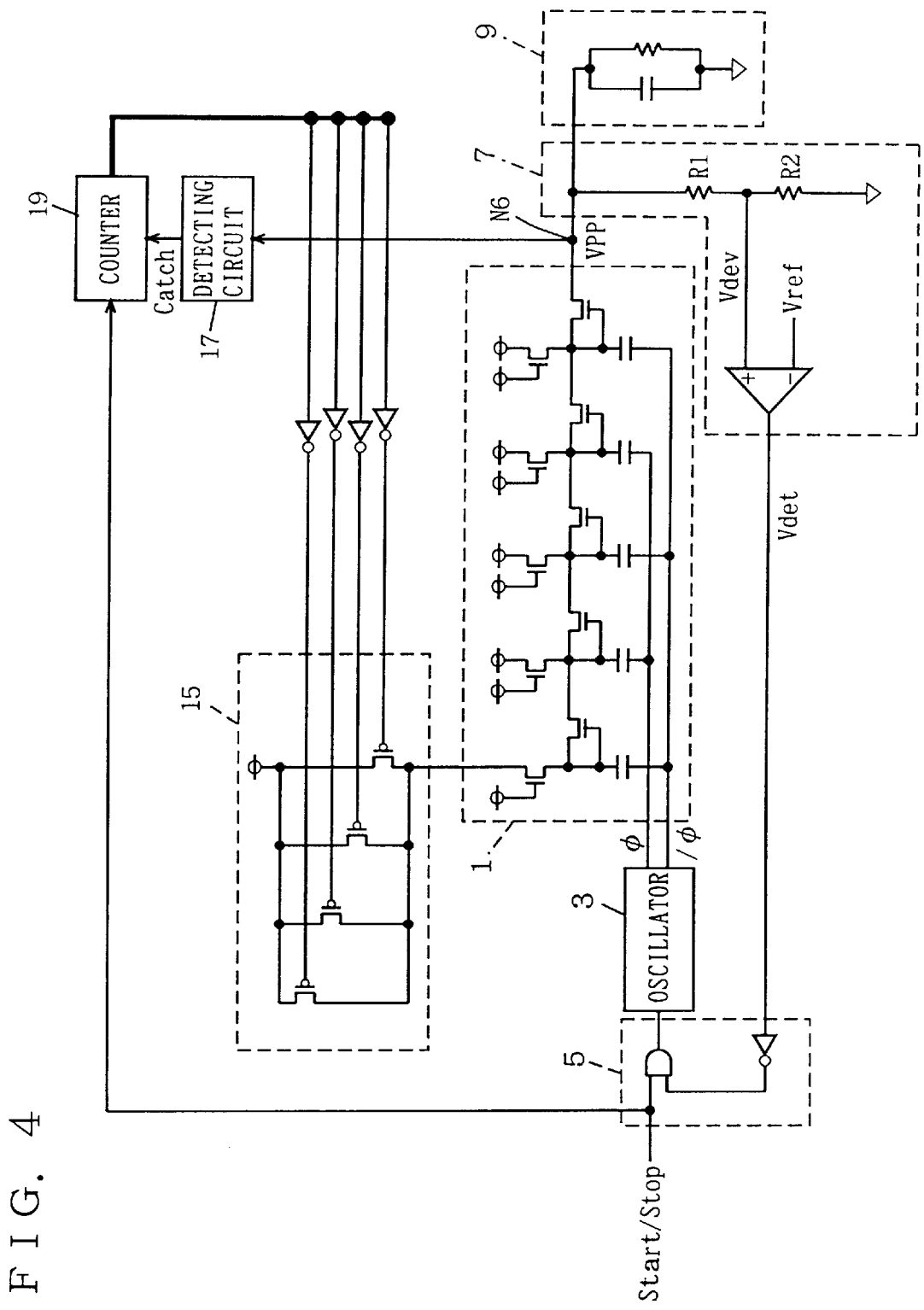
FIG. 4 shows an overall structure of a high voltage generating device in accordance with a second embodiment of the present invention.

FIG. 4 shows a structure of a high voltage generating device in accordance with the second embodiment of the present invention.

As shown in FIG. 4, the high voltage generating device in accordance with the second embodiment has the same structure as the one of the first embodiment above except that it includes, as a means for estimating the magnitude of externally connected load 9, a detecting circuit 17 connected to output node N6 of charge pump 1, and a counter 19 connected to detecting circuit 17 for operating synchronously with charge pump activating signal Start/Stop and counting time after charge pump 1 starts its operation.

Here, detecting circuit 17 which has the same structure as detecting circuit 7 has a reference voltage set lower than a desirable output voltage.

Operation of the high voltage generating device in accordance with the second embodiment will be described below with reference to FIG. 5.

When charge pump 1 starts its operation in response to high level charge pump activating signal Start/Stop, detecting circuit 17 starts measuring the output voltage of charge pump 1. At the same time, counter 19 counts time after charge pump 1 starts the operation.

When the output voltage of charge pump 1 reaches a predetermined set voltage Vc, detecting circuit 17 outputs a high level signal Catch to counter 19. Counter 19 completes its measuring in response to the signal and holds the measured value. As shown in FIG. 5, the output voltage of charge pump 1 reaches set voltage Vc in a shorter time period when externally connected load 9 is light. In this case, counter 19 is stopped early by signal Catch and it holds a smaller value. This produces a smaller 4 bit digital value output from counter 19 to current limiting circuit 15. Since the value is inverted by an inverter, a smaller number of P channel MOS transistors PT1 to PT4 turn on, and the magnitude of current supplied to charge pump 1 becomes smaller. Therefore, smaller load 9 decreases the boosting capability of charge pump 1.

On the other hand, since the output voltage of charge pump 1 reaches set voltage Vc in a longer time period when load 9 is heavy, counter 19 is stopped late by signal Catch and it holds a larger value. This results in a larger 4 bit digital value output from counter 19 to current limiting circuit 15. Since the value is inverted by the inverter, a larger number of P channel MOS transistors PT1 to PT4 turn on, making the magnitude of current supplied to charge pump 1 larger. Therefore, the boosting capability of charge pump 1 is increased with larger load 9.

As described above, the high voltage generating device in accordance with the second embodiment also adjusts the boosting capability of charge pump 1 according to the magnitude of load 9 connected externally, thus suppressing the ripple.

Third Embodiment

Figure 6:
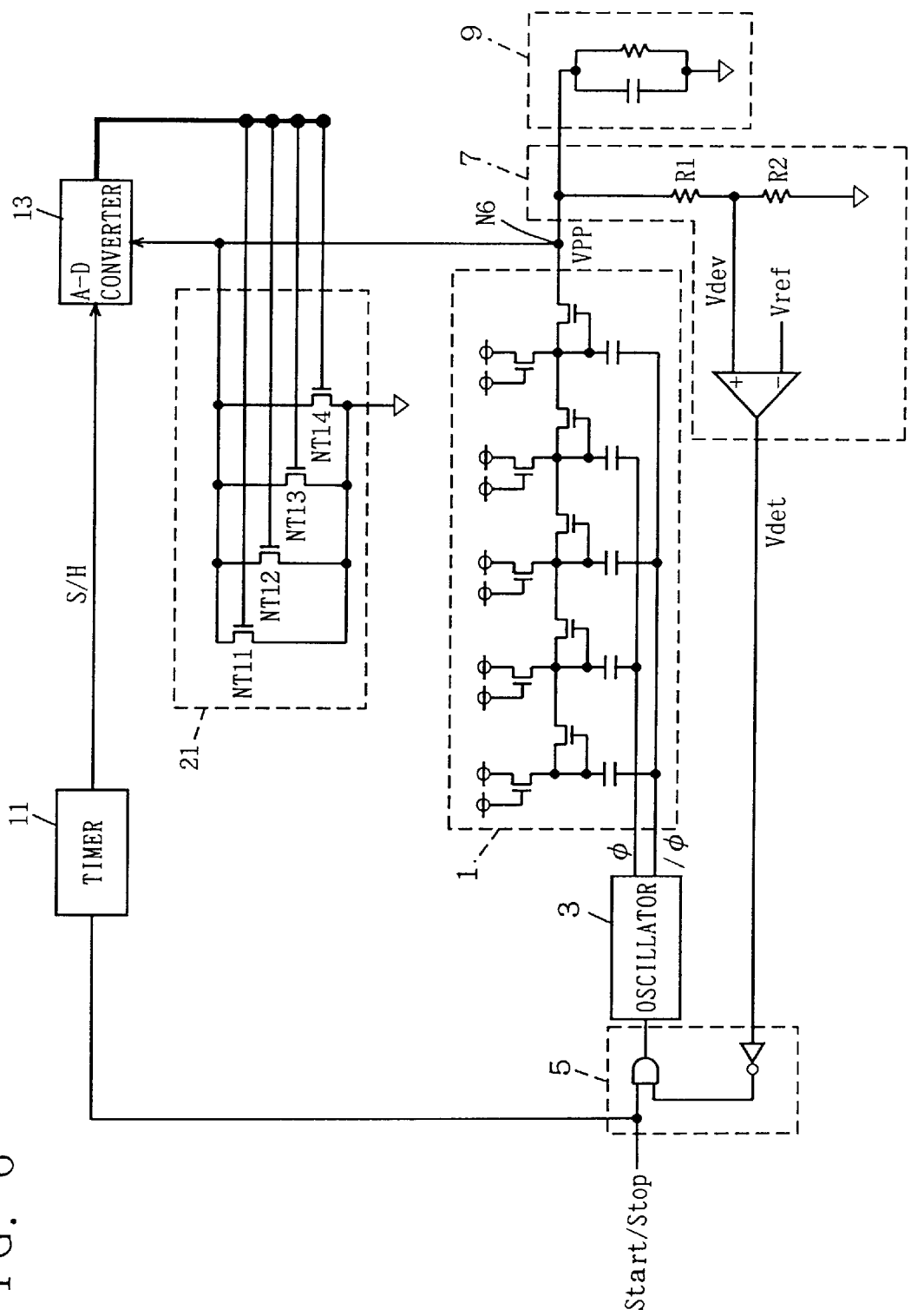
FIG. 6 shows an overall structure of a high voltage generating device in accordance with a third embodiment of the present invention.

FIG. 6 shows a structure of a high voltage generating device in accordance with the third embodiment of the present invention.

As shown in FIG. 6, the high voltage generating device in accordance with the third embodiment has the same structure as the one of the first embodiment except that it includes a clip circuit 21 instead of current limiting circuit 15.

This clip circuit 21 includes four N channel MOS transistors NT11 to NT14 connected in parallel between a ground node and output node N6 of charge pump 1.

Next, operation of the high voltage generating device in accordance with the third embodiment will be described.

When high level charge pump activating signal Start/Stop is input to charge pump control circuit 5, oscillator 3 is activated and charge pump 1 starts its operation. Timer 11 starts operation in response to high level charge pump activating signal Start/Stop, and outputs sample/hold signal S/H after a prescribed time period.

A-D converter 13 receives the output voltage from output node N6 of charge pump 1 in response to sample/hold signal S/H output from timer 11, and converts its magnitude to a digital signal. This digital signal is 4 bit binary data, and a signal (Vcc/GND) corresponding to each bit is respectively input to gates of four N channel MOS transistors NT11 to NT14.

Therefore, the amount of leak current from output node N6 of charge pump 1 is variable according to the number of these N channel MOS transistors NT11 to NT14 which are on.

For example, when load 9 is light, A-D converter 13 outputs a larger digital value, and a larger number of N channel MOS transistors NT11 to NT14 included in clip circuit 21 are on. Therefore, more current output from charge pump 1 leaks in clip circuit 21, decreasing the boosting capability of charge pump 1.

On the contrary, when load 9 is heavy, A-D converter 13 outputs a smaller digital value, and a smaller number of N channel MOS transistors NT11 to NT14 included in clip circuit 21 are on, increasing the boosting capability of charge pump 1.

Such operation varies the amount of output current without changing the drivability of charge pump 1, so that the boosting capability of charge pump 1 is seemingly increased and decreased, and the ripple is suppressed.

Fourth Embodiment

Figure 7:
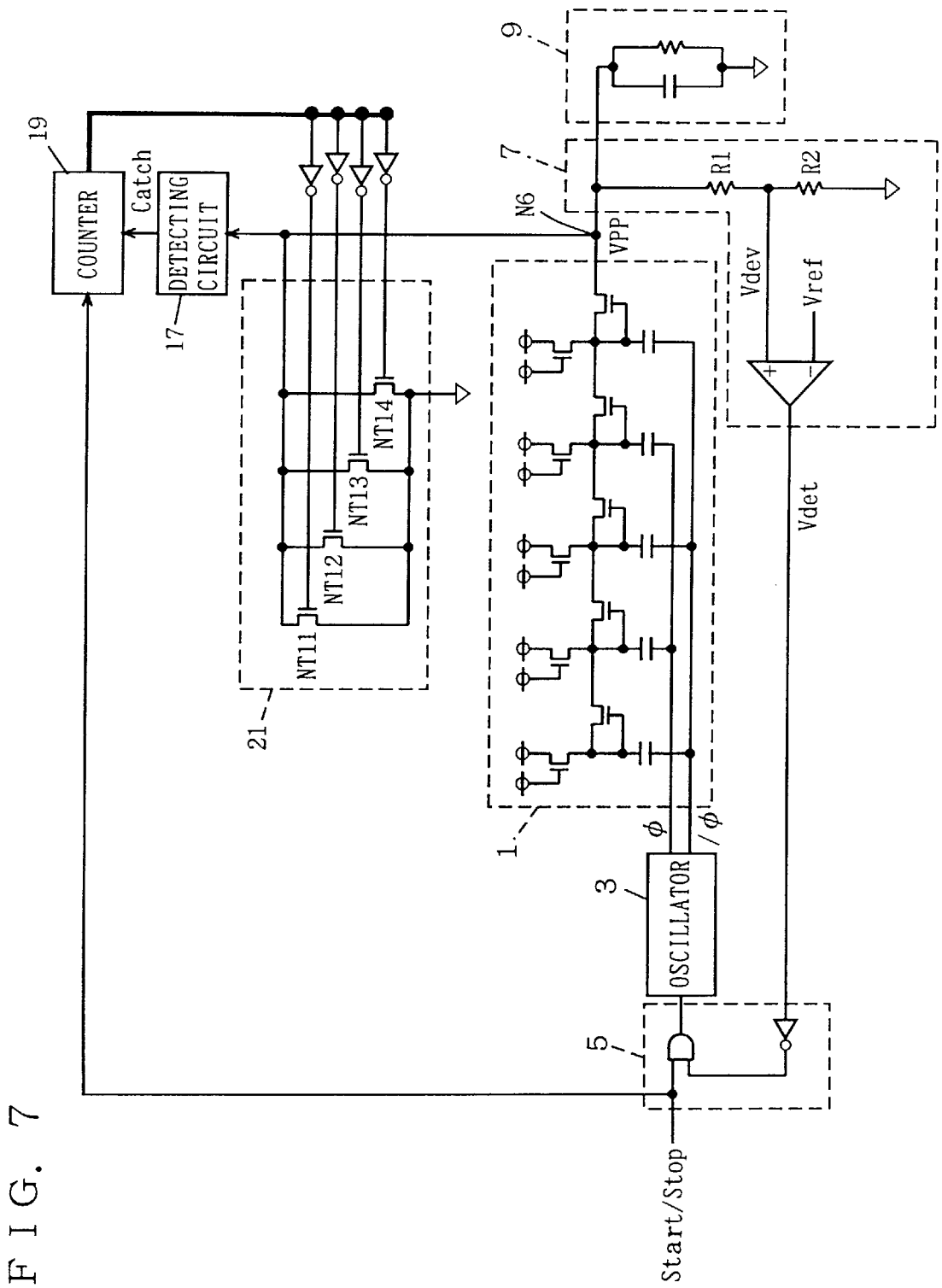
FIG. 7 shows an overall structure of a high voltage generating device in accordance with a fourth embodiment of the present invention.

FIG. 7 shows a structure of a high voltage generating device in accordance with the fourth embodiment of the present invention.

As shown in FIG. 7, the high voltage generating device in accordance with the fourth embodiment has the same structure as the one of the third embodiment except that it includes, as a means for estimating the magnitude of load 9, counter 19 and detecting circuit 17 described in the second embodiment above, instead of timer 11 and A-D converter 13.

Figure 5:
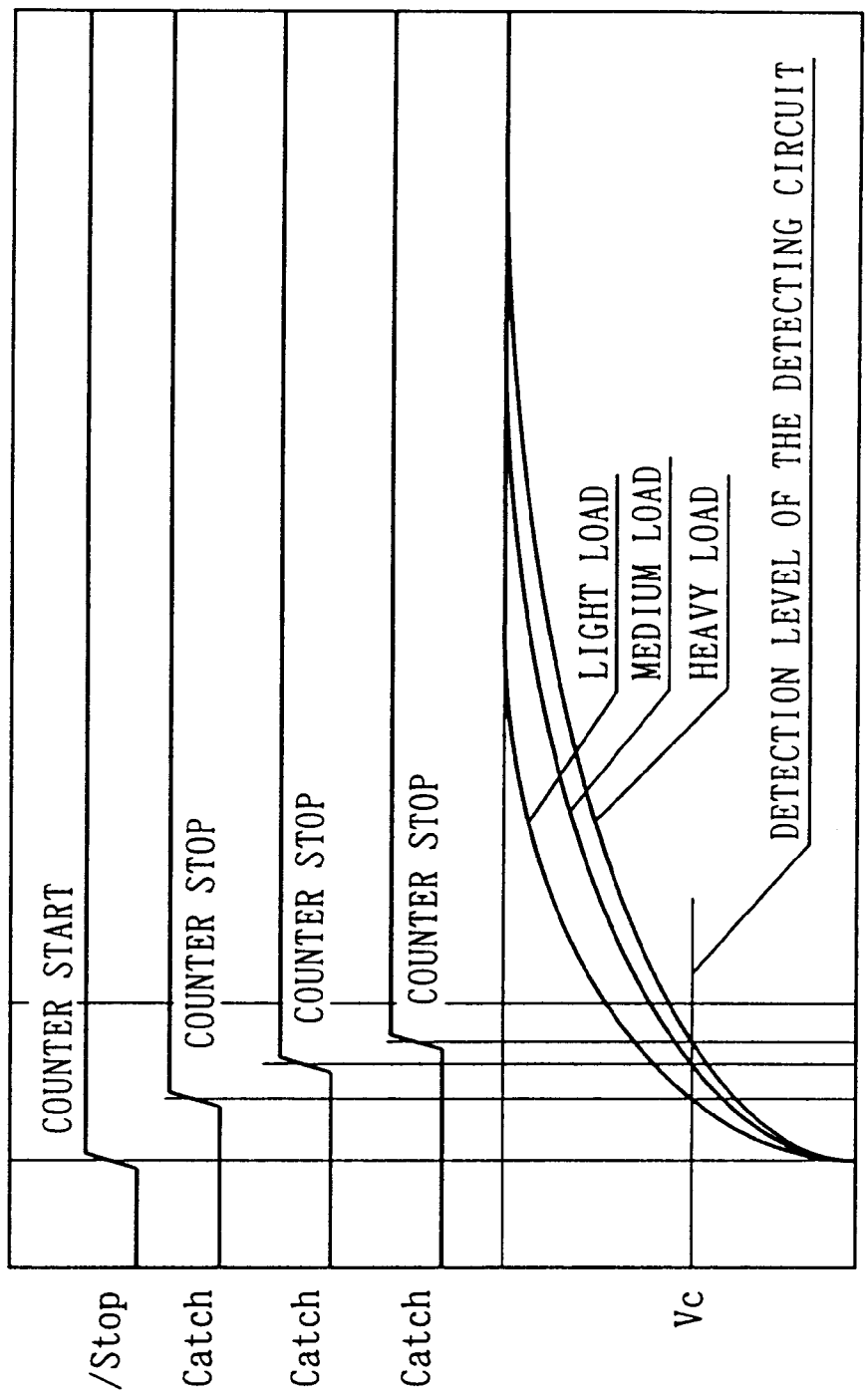
FIG. 5 illustrates operation of a counter shown in FIG. 4.

In the high voltage generating device in accordance with the fourth embodiment, detecting circuit 17 outputs signal Catch to counter 19 early when load 9 is light as shown in FIG. 5, so that counter 19 stops soon after charge pump 1 starts operation, and outputs a smaller digital value corresponding to a measured time period. Therefore, a larger number of N channel MOS transistors NT11 to NT14 included in clip circuit 21 are on, reducing the amount of output current from charge pump 1. In this case, the boosting capability of charge pump 1 is seemingly decreased.

On the contrary, since counter 19 outputs a larger digital value when load 9 is heavy, a larger number of N channel MOS transistors NT11 to NT14 are on, seemingly increasing the boosting capability of charge pump 1.

As described above, the high voltage generating device in accordance with the fourth embodiment also adjusts the boosting capability of charge pump 1 according to the magnitude of load 9, thus the ripple can be suppressed.

Fifth Embodiment

Figure 8:
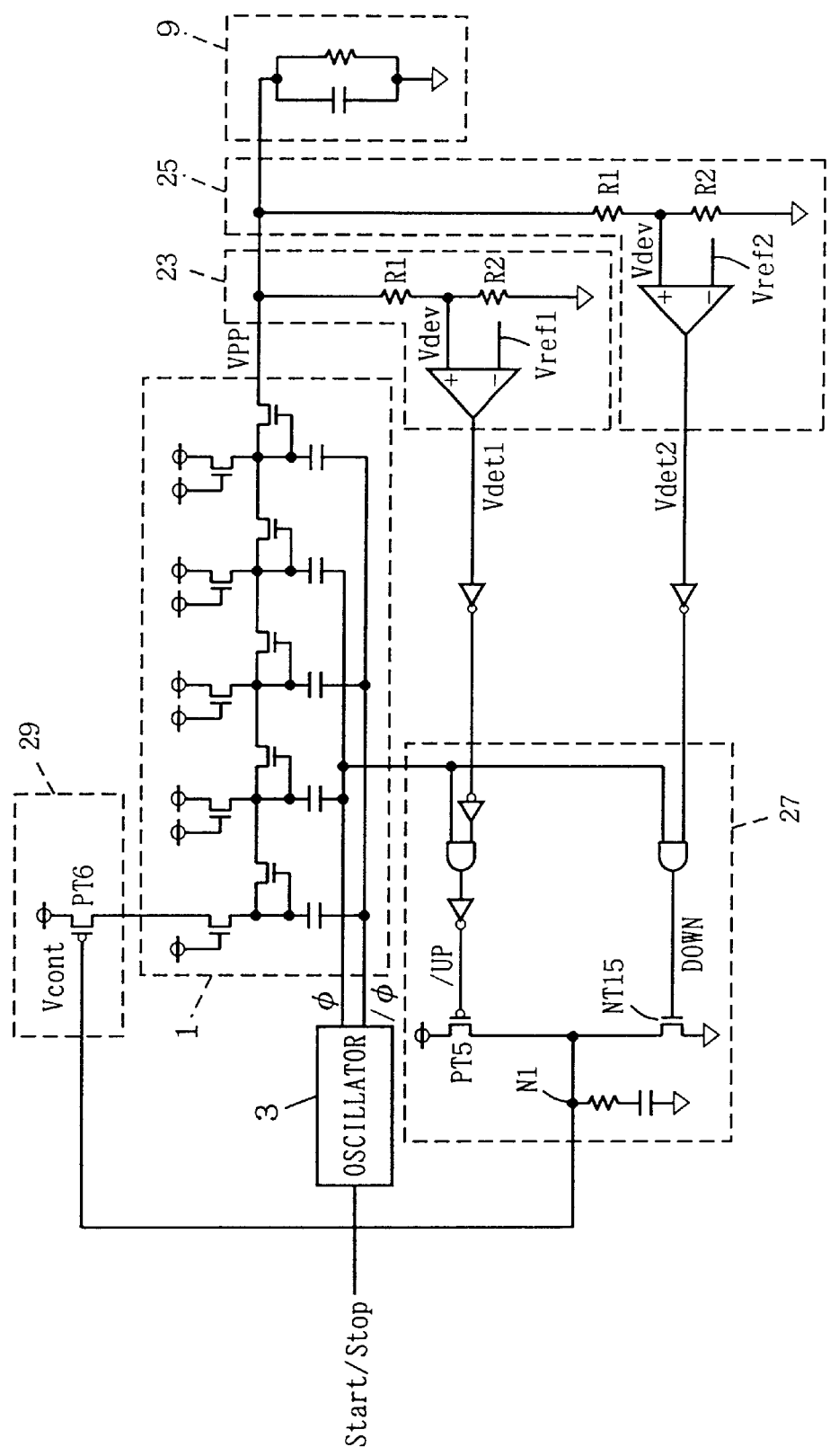
FIG. 8 shows an overall structure of a high voltage generating device in accordance with a fifth embodiment of the present invention.

FIG. 8 shows a structure of a high voltage generating device in accordance with the fifth embodiment of the present invention.

As shown in FIG. 8, the high voltage generating device in accordance with the fifth embodiment includes oscillator 3, charge pump 1, detecting circuits 23, 25 comparing the output voltage of charge pump 1 with reference voltages Vref1, Vref2, respectively, a current limiting circuit 29 supplying current to charge pump 1, and a filter circuit 27 controlling current limiting circuit 29.

Here, each one of detecting circuits 23, 25 has the same structure as detecting circuit 7 of a conventional high voltage generating device. Reference voltage Vref1 is lower than reference voltage Vref2.

Further, current limiting circuit 29 includes a P channel MOS transistor PT6 having its source connected to a power supply node.

Structure and operation of filter circuit 27 will be described below with reference to FIG. 9.

Figure 9:
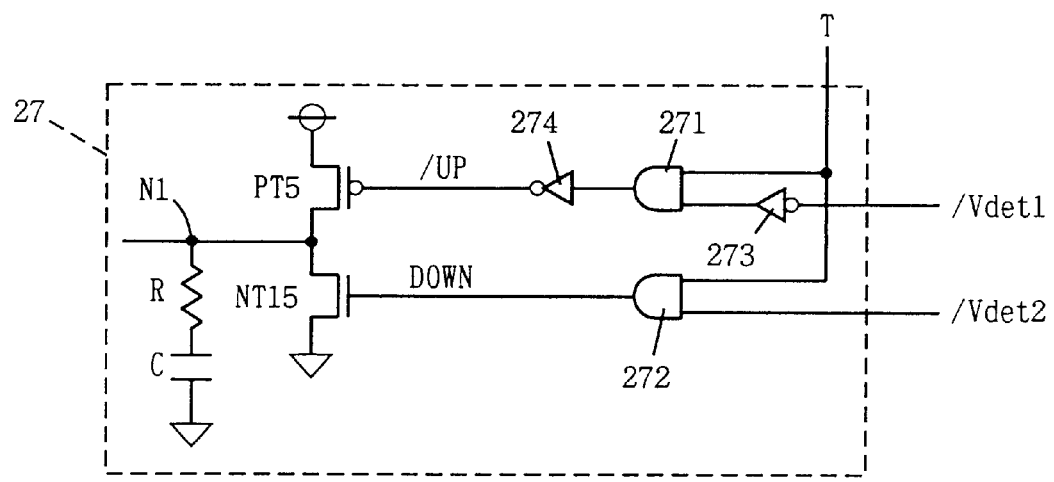
FIG. 9 shows a structure of a filter circuit shown in FIG. 8.

As shown in FIG. 9, filter circuit 27 includes an inverter 273 inverting a signal /Vdet1, an AND circuit 271 receiving a signal T and an output signal from inverter 273, an AND circuit 272 receiving signal T and a signal /Vdet2, an inverter 274 inverting an output signal from AND circuit 271, a P channel MOS transistor PT5 having its gate receiving an output signal /UP from inverter 274 and its source connected to a power supply node, an N channel MOS transistor NT15 having its gate receiving an output signal DOWN from AND circuit 272 and its source connected to a ground node, a resistor R, and a capacitor C.

In this filter circuit 27, activation (a low level) of signal /UP turns on P channel MOS transistor PT5, thus node N1 is charged.

On the other hand, activation (a high level) of signal DOWN turns on N channel MOS transistor NT15, thus node NT1 is discharged. Signals /UP and DOWN are pulse signals generated when clock signal T is at the high level. Therefore, whenever clock signal T is activated, node N1 is charged or discharged according to the state of signals /Vdet1 and /Vdet2. In short, the voltage level of node N1 varies in an analog manner according to the frequency of activation of signals /Vdet1 and /Vdet2.

Specifically, when clock signal T is at the high level, signals /UP and Vdet1 and signals DOWN and /Vdet2 have common logical valves, respectively. When clock signal T is at the low level, signals /UP and DOWN are at the high and low levels, respectively. Therefore, when clock signal T is at the low level, P channel MOS transistor PT5 and N channel MOS transistor NT15 are both turned off. Meanwhile, when clock signal T is at the high level, potential of node N1 rises if the frequency of signal /Vdet1 activation is high, and lowers if the frequency of signal /Vdet2 activation is high.

Sizes of P channel MOS transistor PT5 and N channel MOS transistor NT15 are determined such that the potential of node N1 is kept constant when signals /UP and DOWN are simultaneously activated.

Operation of the high voltage generation device in accordance with the fifth embodiment of the present invention will be described below.

Filter circuit 27 receives a clock signal φ output form oscillator 3. Output signal Vdet1 of detecting circuit 23 attains the high level when the output voltage Vpp of charge pump 1 satisfies VPP>(R1+R2)·Vref1/R2. Meanwhile, output signal Vdet2 of detecting circuit 25 attains the high level when output voltage VPP>(R1+R2)·Vref2/R2.

When output voltage VPP of charge pump 1 is lower than (R1+R2)·Vref1/R2 and signals Vdet1, Vdet2 are both at the low level, N channel MOS transistor NT15 included in filter circuit 27 is turned on, lowering potential Vcont of node N1. Thus, P channel MOS transistor PT6 included in current limiting circuit 29 is turned on.

Then output voltage VPP of charge pump 1 is higher than (R1+R2)·Vref1/R2 and lower than (R1+R2)·Vref2/R2, signals Vdet1 and Vdet2 are at the high and low levels, respectively, and potential Vcont of node N1 is kept at a constant level by filter circuit 27. Since potential Vcont of node N1 is constant in this case, a constant amount of current is supplied to charge pump 1, keeping the boosting capability of charge pump 1 constant.

Then, when output voltage VPP of charge pump 1 is higher than (R1+R2)·Vref2/R2 and signals Vdet1, Vdet2 are both at the high level, P channel MOS transistor PT5 included in filter circuit 27 is turned on, raising potential Vcont of node N1. This reduces the amount of current supplied to charge pump 1 through P channel MOS transistor PT6. In this case, the boosting capability of charge pump 1 is decreased.

As above, the boosting capability is adjusted so that output voltage VPP of charge pump 1 has a constant level, and thus a ripple is suppressed.

Sixth Embodiment

Figure 10:
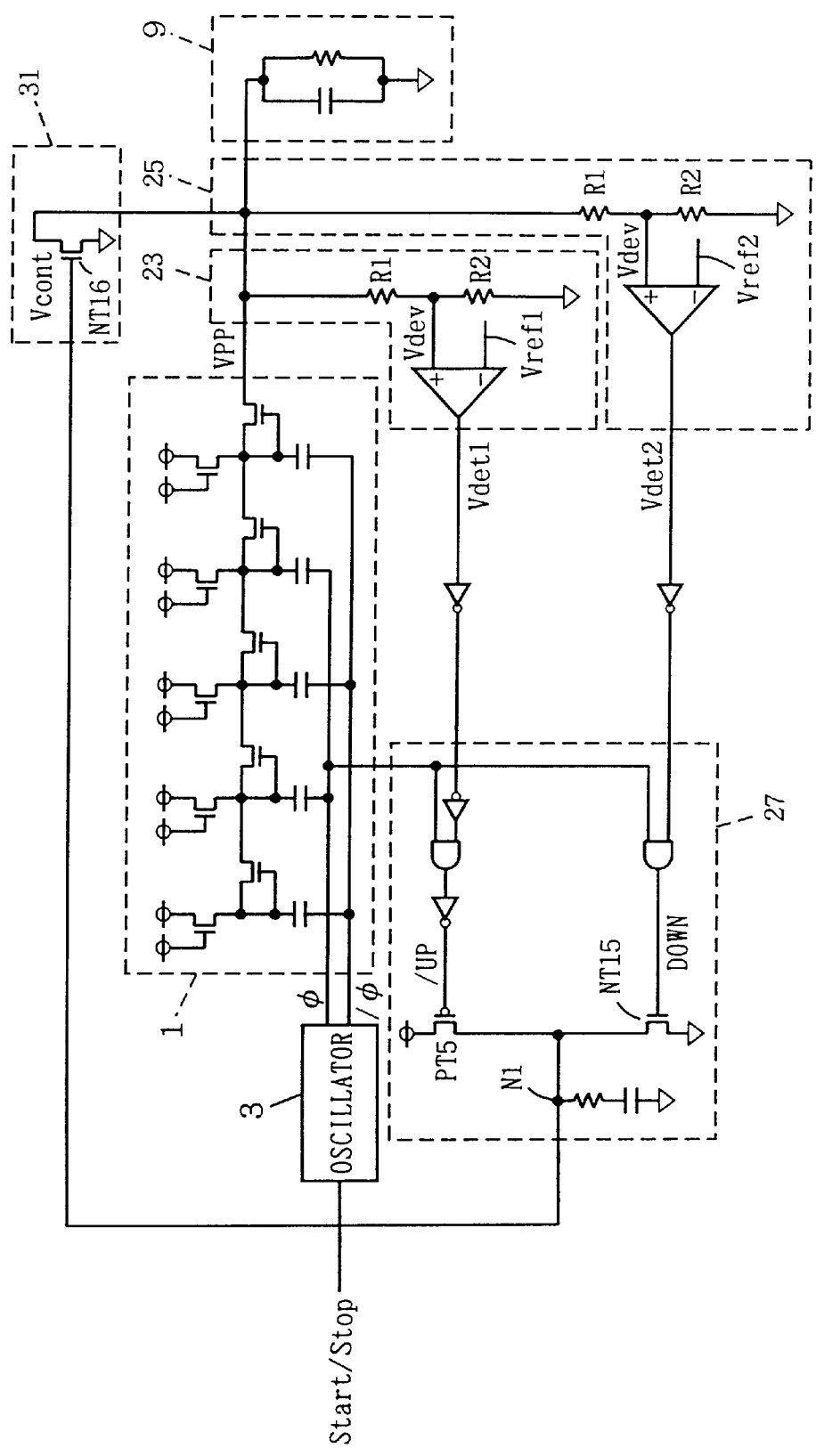
FIG. 10 shows an overall structure of a high voltage generating device in accordance with a sixth embodiment of the present invention.

FIG. 10 shows a structure of a high voltage generating device in accordance with the sixth embodiment of the present invention.

As shown in FIG. 10, the high voltage generating device in accordance with the sixth embodiment has the same structure as the one of the fifth embodiment except that it includes a clip circuit 31 instead of current limiting circuit 29.

This clip circuit 31 includes an N channel MOS transistor NT16 having its source connected to a ground node, its drain connected to an output node of charge pump 1, and its gate connected to node N1 included in filter circuit 27.

Operation of the high voltage generating device in accordance with the sixth embodiment will be described below.

When output voltage VPP of charge pump 1 is lower than (R1+R2)·Vref1/R2, signals Vdet1, Vdet2 output respectively from detecting circuits 23, 25 are both at the low level, and N channel MOS transistor NT15 included in filter circuit 27 is turned on, lowering potential Vcont of node N1.

This reduces the amount of current leaking through N channel MOS transistor NT16 included in clip circuit 31.

When output voltage VPP of charge pump 1 is higher than (R1+R2)·Vref1/R2 and lower than (R1+R2)·Vref2/R2, signals Vdet1 and Vdet2 assume the high and low levels, respectively, keeping potential Vcont of node N1 constant. I this case, the amount of current leak in clip circuit 31 is kept constant.

When output voltage VPP of charge pump 1 is higher than (R1+R2)·Vref2/R2, signals Vdet1 and Vdet2 are both at the high level, and P channel MOS transistor PT5 included in filter circuit 27 is turned on, raising potential Vcont of node N1. This increases the amount of current leaking through N channel MOS transistor NT16 included in clip circuit 31.

In this case, the boosting capability of charge pump 1 is decreased.

The ripple is suppressed by adjusting the amount of current leak in clip circuit 31 so that the output voltage VPP of charge pump 1 is constant as described above Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high voltage generating device, comprising:

high voltage generating means for generating high voltage by boosting a sower supply voltage and supplying the generated high voltage to a load;

load estimating means for estimating magnitude of said load; and boosting capability control means for controlling boosting capability of said high voltage generating means according to the magnitude of said load estimated by said load estimating means, wherein said load estimating means includes:

a timer outputting a sample signal after a prescribed time period since activation of said high voltage generating means, and voltage detecting means responsive to said sample signal for detecting magnitude of the high voltage from said high voltage generating means.

2. The high voltage generating device according to claim 1, wherein said boosting capability control means varies magnitude of current supplied from a power supply to said high voltage generating means.

3. The high voltage generating device according to claim 2, wherein said boosting capability control means includes a plurality of transistors connected in parallel between said power supply and a node at which said high voltage generating means receives said power supply voltage from said power supply and controlled by said load estimating means.

4. The high voltage generating device according to claim 1, wherein said boosting capability control means varies magnitude of current output from said high voltage generating means.

5. The high voltage generating device according to claim 4, wherein said boosting capability control means includes a plurality of transistors connected in parallel between a ground node and a node at which said high voltage generating means receives a ground voltage from said ground node and controlled by said load estimating means.

6. A high voltage generating device, comprising:

high voltage generating means for generating high voltage by boosting a power supply voltage and supplying the generated high voltage to a load;

load estimating means for estimating magnitude of said load; and boosting capability control means for controlling boosting capability of said high voltage generating means according to the magnitude of said load estimated by said load estimating means, wherein said load estimating means includes:

output voltage detecting means for detecting magnitude of the high voltage from said high voltage generating means, and measuring means for measuring time until said detected magnitude reaches a prescribed magnitude after activation of said high voltage generating means.

7. The high voltage generating device according to claim 6, wherein said boosting capability control means varies magnitude of current supplied from the power supply to said high voltage generating means.

8. The high voltage generating device according to claim 7, wherein said boosting capability control means includes a plurality of transistors connected in parallel between said power supply and a node at which said high voltage generating means receives said power supply voltage from said power supply and controlled by said load estimating means.

9. The high voltage generating device according to claim 6, wherein said boosting capability control means varies magnitude of current output from said high voltage generating means.

10. The high voltage generating device according to claim 9, wherein said boosting capability control means includes a plurality of transistors connected in parallel between a ground node and a node at which said high voltage generating means receives a ground voltage from said ground node and controlled by said load estimating means.

11. A high voltage generating device, comprising:
high voltage generating means for generating high voltage by boosting a power supply voltage and supplying the generated high voltage to a load;
output voltage detecting means for detecting magnitude of the high voltage from said high voltage generating means, said output voltage detecting means being configured to produce output signals indicating variations of said high voltage with respect to a preset voltage range; and
boosting capability control means for controlling boosting capability of said high voltage generating means according to the magnitude of the high voltage detected by said output voltage detecting means,
said boosting capability control means including a filter circuit responsive to the output signals for adjusting the boosting capacity of said high voltage generating means.

12. The high voltage generating device according to claim 11, wherein said boosting capability control means varies magnitude of current supplied from a power supply to said high voltage generating means.

13. The high voltage generating device according to claim 11, wherein said boosting capability control means varies magnitude of current output from said high voltage generating means.

14. The high voltage generating device of claim 11, wherein said output voltage detecting means is configured to produce a first output signal when the high voltage exceeds a first preset value, and to produce a second output signal when the high voltage exceeds a second preset value higher than said first preset value.

15. The high voltage generating device of claim 14, wherein said filter circuit is configured to decrease the boosting capacity when said output voltage detecting means produces both the first and second output signals.

16. The high voltage generating device of claim 14, wherein said filter circuit is configured to increase the boosting capacity when said output voltage detecting means produces neither the first output signal nor the second output signal.

17. The high voltage generating device of claim 14, wherein said filter circuit is configured to maintain the boosting capacity constant when said output voltage detecting means produces said first output signal and does not produce said second output signal.

* * * * *

UNITED STATES PATENT AND TRADEMARK OFFICE
CERTIFICATE OF CORRECTION

PATENT NO. : 5,940,283
DATED : August 17, 1999
INVENTOR(S) : Masaaki MIHARA, et al It is certified that error appears in the above-identified patent and that said Letters Patent is hereby corrected as shown below:

Claims 14-17, line 1 of each, change "of" to --according to--.

Signed and Sealed this

Fourteenth Day of March, 2000

Attest:

Q. TODD DICKINSON

*Attesting Officer*       *Commissioner of Patents and Trademarks*